United States Patent
Morales

(10) Patent No.: US 11,660,875 B1
(45) Date of Patent: May 30, 2023

(54) METHODS AND SYSTEM FOR GRANULAR INK ESTIMATION FOR PRINTING OPERATIONS

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/512,748

(22) Filed: Oct. 28, 2021

(51) Int. Cl.
*G06F 3/12* (2006.01)
*B41J 2/175* (2006.01)
*H04N 1/60* (2006.01)

(52) U.S. Cl.
CPC ........ *B41J 2/17566* (2013.01); *G06F 3/1239* (2013.01); *H04N 1/605* (2013.01); *B41J 2002/17569* (2013.01)

(58) Field of Classification Search
CPC ......... B41J 2/17566; B41J 2002/17569; G06F 3/1239; H04N 1/605
See application file for complete search history.

(56) References Cited

U.S. PATENT DOCUMENTS

| | | | |
|---|---|---|---|
| 5,751,434 A * | 5/1998 | Narendranath | H04N 1/4072 358/448 |
| 8,582,175 B2 | 11/2013 | Takeo | |
| 8,941,876 B2 | 1/2015 | Tamagawa | |
| 9,656,463 B1 * | 5/2017 | Ernst | B41J 2/04581 |
| 10,115,134 B1 * | 10/2018 | Wozniak | G06F 3/1256 |
| 11,157,219 B1 * | 10/2021 | Morales | G06F 3/1219 |
| 11,262,959 B1 * | 3/2022 | Morales | G06K 15/407 |
| 2002/0165833 A1 * | 11/2002 | Minowa | H04N 1/00005 705/400 |
| 2004/0196331 A1 * | 10/2004 | Zerza | B41J 2/21 347/43 |
| 2004/0239992 A1 * | 12/2004 | Kawai | G06F 3/1232 358/1.15 |
| 2008/0111842 A1 * | 5/2008 | Hall | B41J 2/17566 347/7 |
| 2008/0159768 A1 * | 7/2008 | Katoh | G06Q 10/063 399/79 |
| 2010/0005038 A1 * | 1/2010 | Nagarajan | G06Q 30/0283 705/400 |
| 2010/0153145 A1 * | 6/2010 | Klassen | G03G 15/5016 707/E17.023 |
| 2011/0090520 A1 | 4/2011 | Yokoi et al. | |

(Continued)

FOREIGN PATENT DOCUMENTS

WO WO-2010056739 A2 * 5/2010 ............. G03G 21/02

*Primary Examiner* — Ted W Barnes
(74) *Attorney, Agent, or Firm* — Millen, White, Zelano & Branigan, P.C.; William Nixon

(57) ABSTRACT

A printing system receives print jobs having pages that are separated by different levels of ink use to print the pages. The number of pages for different ink use levels are determined as well as the cost estimation to print the different pages. Ink use and cost estimates are provided on a granular level as opposed to overall ink use and costs for printing a print job. Modifications are made to one or more pages to lower ink use for those specific pages as opposed to the print job as a whole. The printing system displays the different ink use levels as well as the cost estimates.

14 Claims, 8 Drawing Sheets

(56) References Cited

U.S. PATENT DOCUMENTS

| | | | |
|---|---|---|---|
| 2011/0228300 A1* | 9/2011 | Takeo | H04N 1/407 358/1.9 |
| 2013/0128286 A1* | 5/2013 | Tamagawa | H04N 1/605 358/1.2 |
| 2015/0078774 A1* | 3/2015 | Robinson | G03G 15/0121 399/223 |
| 2017/0253063 A1* | 9/2017 | Schuppan | H04N 1/603 |
| 2018/0065376 A1* | 3/2018 | Sakurai | B41J 2/17566 |
| 2019/0050182 A1* | 2/2019 | Wozniak | G06F 3/1285 |
| 2019/0268482 A1* | 8/2019 | Stanich | H04N 1/00005 |
| 2020/0108621 A1* | 4/2020 | Ferreri | B41J 2/17566 |
| 2020/0272388 A1* | 8/2020 | Sugiyama | G06F 3/1259 |
| 2020/0304688 A1* | 9/2020 | Tsuji | H04N 1/0044 |
| 2021/0365218 A1* | 11/2021 | Sutherland | G06F 3/04842 |
| 2021/0387458 A1* | 12/2021 | Bhaskaran | B41J 2/17546 |

\* cited by examiner

METHODS AND SYSTEM FOR GRANULAR INK ESTIMATION FOR PRINTING OPERATIONS

FIELD OF THE INVENTION

The present invention relates to granular ink estimation for print jobs. More particularly, the present invention relates to determining ink use for a print job at a printing device to identify cost savings at a granular level.

DESCRIPTION OF THE RELATED ART

Current ink use estimation tools provide users with total ink use per colorant and with total cost for ink use. While this information can be useful for customers to predict cost and the shop to accurately price jobs, it may only provide aggregate information that hides other potentially useful information. In other words, current tools only show overall ink use information.

SUMMARY OF THE INVENTION

A method for determining ink use at a printing device is disclosed. The method includes receiving a print job having a plurality of pages. The method also includes defining an ink use range using a minimum ink use value and a maximum ink use value for the print job. The method also includes dividing the ink use range into a plurality of ink use levels. Each ink use level is defined by an amount of ink used to print one page of the print job. The method also includes, for each page, placing the page into an ink use level based on an estimated ink use to print the page. The method also includes determining a number of pages for each ink use level. The method also includes determining an estimated cost for each ink use level. The method also includes displaying the ink use range with the plurality of ink use levels. Each ink use level is associated with its respective number of pages and its respective estimated cost.

A method for determining ink use at a printing device is disclosed. The method includes receiving a variable data printing (VDP) print job having at least two pages. The method also includes identifying a plurality of unique document pages used to generate the VDP print job. Each of the plurality of unique document pages includes an object. The method also includes estimating ink use for each of the plurality of unique document pages. The method also includes, for each page in the VDP print job, associating the page with one of the plurality of unique document pages. The method also includes determining a number of pages associated with each unique document page. The method also includes determining an estimated cost for each unique document page based on the number of pages. The method also includes displaying the plurality of unique document pages. Each unique document page is associated with its respective number of pages and its respective estimated cost.

A method for implementing alternate ink use operations is disclosed. The method includes receiving a print job having a plurality of pages. The method also includes determining ink use for color reproduction for at least one page of the plurality of pages in the print job. The method also includes modifying color printing resources for the at least one page. The color printing resources result in an ink use for printing the at least one page. The method also includes updating the ink use for the at least one page based on the modified color printing resources. The method also includes determining a cost adjustment for printing the print job using the modified color printing resources for the at least one page.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1:
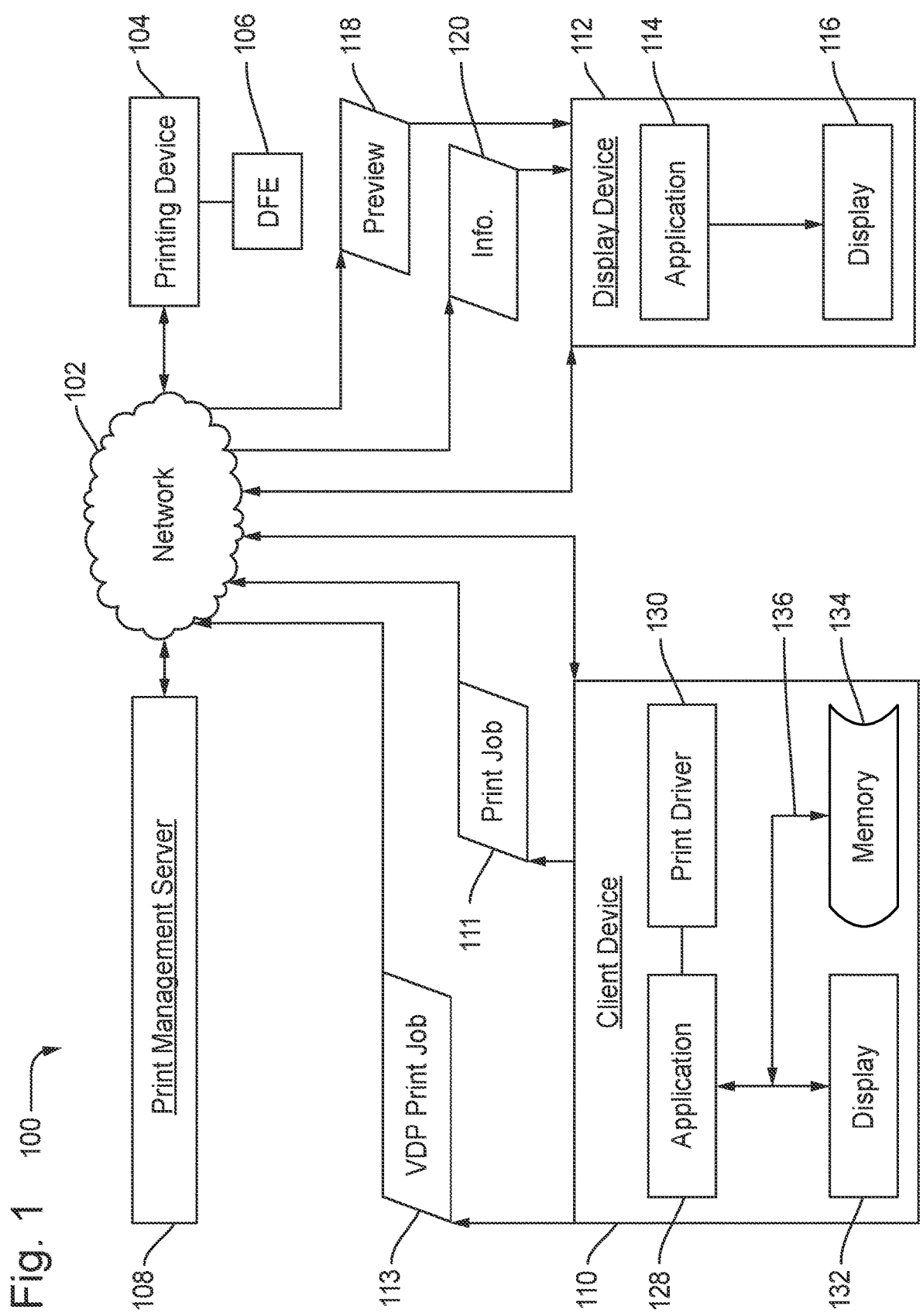
FIG. 1 illustrates a printing system for printing documents using a printing device according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide a more granular view of the ink use within a print job. The granular view may provide opportunities for print shops and their customers to save on production costs. For example, a breakdown of ink use volume per page and the number of pages in each bucket may show that 3% of the pages for a print job use 20% of all the ink used in the job. This information may be used by the print shop to suggest that the customer change those few pages to achieve costs savings on the overall print job. This type of feedback is not possible using current tools that only show overall ink use information.

The disclosed embodiments set forth a system that displays ink use data in a much more granular manner versus current ink estimation systems. As with conventional printing systems, the disclosed printing system would report total ink use and ink cost per colorant. Further, the disclosed printing system would track ink use for every single page of the document in order to report the following metrics of an ink use range and an ink use distribution.

For the ink use range, the disclosed embodiments may determine and provide both the minimum and maximum ink use as well as the cost per page with its overall ink use information. For the ink use distribution, the disclosed embodiments may take the ink use range determined above and divide it into a plurality of ink use levels, or "buckets." For example, an ink use range may be divided into the ink use levels, such as 14 ink use levels, which each level covering a specified amount of ink use for the pages assigned that level. The disclosed embodiments may show a count for the number of pages within each level.

The disclosed embodiments also may show the cost of ink use for each ink use level. This feature may allow a print shop to understand the cost contribution for subsets of the pages. For example, it may be shown that 5% of the pages represent 20% of the ink use and cost. The print shop also may use this information to suggest changes to the document to lower ink use. A chart may be used to show this ink use over the ink use range and the ink use distribution.

In some embodiments, the disclosed printing system would allow the customer to see details for each ink use level, or bucket. The user, for example, may click on a bar or ink use level to go to a page that shows not only ink use and costs information but also the document pages that are part of the ink use level. For example, pages 3, 5, 8, and 9 may correspond to a particular ink use level. In addition, the disclosed printing system may allow the user to browse these pages in a user interface. These features would allow a customer to identify pages that may be modified to lower ink use.

An alternate embodiment would involve having the disclosed printing system identify pages in a variable data printing (VDP) document that uses a common underlying template. A report may be determined for each of the unique pages in the template. Thus, ink use reporting may be enabled for VDP documents and print jobs. This feature would allow the print shop and their customers to definitely ascertain which pages may be replaced in order to lower cost.

Further, the disclosed printing system may allow the customer to upload replacement content for each of the estimated pages in a VDP document. The disclosed printing system can then estimate ink use for the replacement pages and provide the updated overall ink use and cost estimation for printing the VDP document. It also may determine the difference in ink use and cost between the new and old VDP pages. Thus, the disclosed embodiments enable the replacement of pages and an update of cost information.

The disclosed printing system also may allow the customer to define alternate color reproduction for the pages in the embodiments disclosed above. In other words, alternate color reproduction may be defined for embodiments using the ink use range distribution levels or the unique VDP template pages. The color reproduction may lower the overall ink limit for those pages. Other color reproduction adjustments also may be made. The disclosed printing system may show the user a preview of the updated pages so that he/she may understand the difference in appearance. The disclosed printing system also may print a sample of the adjusted pages so the user can ascertain the difference in appearance. In addition, the preview printing may show the image twice in the page. It may show an image with the original color settings and an image with the new color settings.

The print shop also may configure the ink estimation to not only provide costs but to provide the customer a quote for the printing portion of the print job. The ink estimation would be offered to the customer so that they can make the same determination as the print shop. This feature will allow the customer to determine what, if any, adjustments they may want to make to the print job in order to lower costs. Thus, the disclosed embodiments enable ink use estimation for print shop customers as well as the print shop.

FIG. 1 depicts a printing system 100 for printing documents using printing device 104 according to the disclosed embodiments. Printing system 100 may be located in a print shop or other environment suitable for production printing operations. Printing system 100 includes one or more printing devices 104 that receive print jobs from one or more client devices 110. Further, printing operations may be managed by print management server 108. As shown in FIG. 1, print job 111 and VDP print job 113 are submitted from client device 110 to printing device 104, but they also may be submitted to print management server 108 which selects printing device 104 to complete the job.

Client device 110 may be capable of executing applications and programs 128 to generate documents and files, such as, for example, a computer, a laptop computer, mobile device or tablet, smart phone, kiosk, and the like. Client device 110 may send print jobs using print driver 130 to printing device 104 over one or more networks 102 implemented within printing system 100. Print driver 130 converts the data generated or created by application 128 into a format that printing device 104 can understand. As shown in FIG. 1, print job 111 and VDP print job 113 are generated at client device 110 and submitted to printing device 104. Additional client devices may be connected to printing device 104, which submit print jobs to printing device 104 or print management server 108.

A user may execute application 128 to generate print job 111 and VDP print job 113, as disclosed in greater detail below. A preview of a set of documents corresponding to print job 111 or VDP print job 113 may be displayed at client device 110 in display 132. Memory 134 may store print job 111 or VDP print job 113 as well as various objects and data used to generate the print job. The components within client device 110 may be connected by data bus 136 to receive and transmit data and signals.

System 100 also includes display device 112 that may receive and exchange data with other devices. In some embodiments, display device 112 may be incorporated in printing device 104. In other embodiments, client device 110 may act as a display device. Display device 112 is treated as a separate device here as it may be used in a production print shop to provide information to a user or customer viewing information 120 about a print job or a preview 118 of the print job. In other words, print job 111 or VDP print job 113 may be generated at client device 110 within the print shop but information or previews are provided to display device 112 so the client device may be used for other operations. Alternatively, client device 110 may be located someplace outside the print shop while display device is within the print shop. Display device 112 may include application 114 to provide the functionality disclosed below. Application 114 may be similar to application 128 to work in conjunction to provide the features of the invention. Display 116 is a display to show information 120 or preview 118.

Network 102 may be used by system 100 to exchange data between the devices within system 100. The devices are configured to communicate with network 102 over a physical communications interface or layer such as air interfaces and/or a direct wired connection. Air interfaces may be a given cellular communications protocol (e.g., GSM, CDMA, W-CDMA, EVDO, eHRPD, EDGE, 4G LTE, 5G LTE, 5G NR/New Radio, etc.) and, or a wireless IP protocol (e.g., IEEE 802.11 family) Alternatively, network 102 may be a local area network, wide area network, an ad-hoc network, and the like. Network 102 allows printing device 104, client device 110, and display device 112 to exchange data using the appropriate protocol.

Printing device 104 is disclosed in greater detail below. It includes an embedded digital front end (DFE) 106, or a printing device controller, that is the workflow touchpoint which accepts a print job, or print file, commonly a PDF or PostScript file. DFE 106 converts the file of a received print job into a format that print engine 260, disclosed below, can use to lay down the content of the document corresponding to the print job on a media. DFE 106 may include a raster image processor (RIP) as well as other components. DFE 106 also may schedule when a received print job is processed and other operations related to printing operations.

Print management server 108 may interact with printing device 104, client device 110 and display device 112 to perform printing operations. In some embodiments, print job 111 or VDP print job 113 is submitted to print management server 108, which then forwards the print job to printing device 104. Print management server 108 may include libraries and other data storage components to enable application 128 to generate VDP print job 113. It also may store information on ink use by printing device 104 as well as help in generating cost estimates for print jobs within system 100.

In some embodiments, print management server 108 is not within printing system 100. In such a case, the functions and features of print management server 108 are provided at client device 110 in conjunction with application 128 or implemented at printing device 104 using DFE 106.

System 100 provides a granular view of ink use within print job 111 or VDP print job 113. This view may provide opportunities to save on production costs. Application 128 or application 114 may be executed to provide these statistics and views within system 100. Further, print management server 108 may do so. Further, printing device 104 may determine this information and display it to a user or customer. For example, a breakdown of ink use volume per page and the number of pages within each ink use level may show that 3% of the pages for print job 111 use 20% of all the ink for the print job. This information may be used by the print shop to suggest that the customer change those few pages to achieve cost savings on the overall job. Ink use for the entire print job does not have to be lowered and print quality sacrificed to lower the cost.

Figure 2:
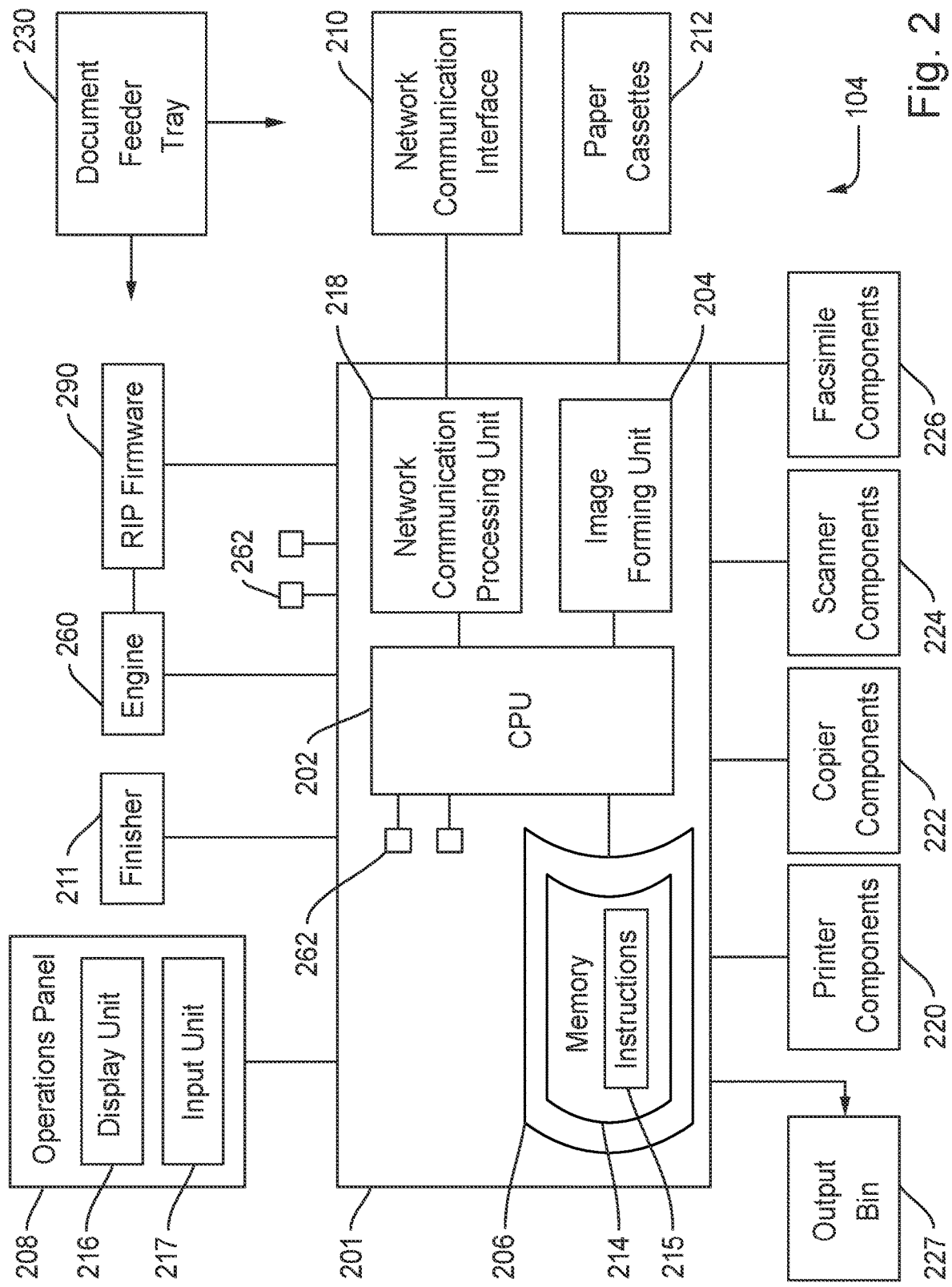
FIG. 2 illustrates a block diagram of components of the printing device for use within the printing system according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from client device 110, display device 112, and print management server 108, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused.

Document processor input feeder tray 230 may include the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFB 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with client device 110 and display device 112 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from client device 110, display device 112, and print management server 108.

Figure 3:
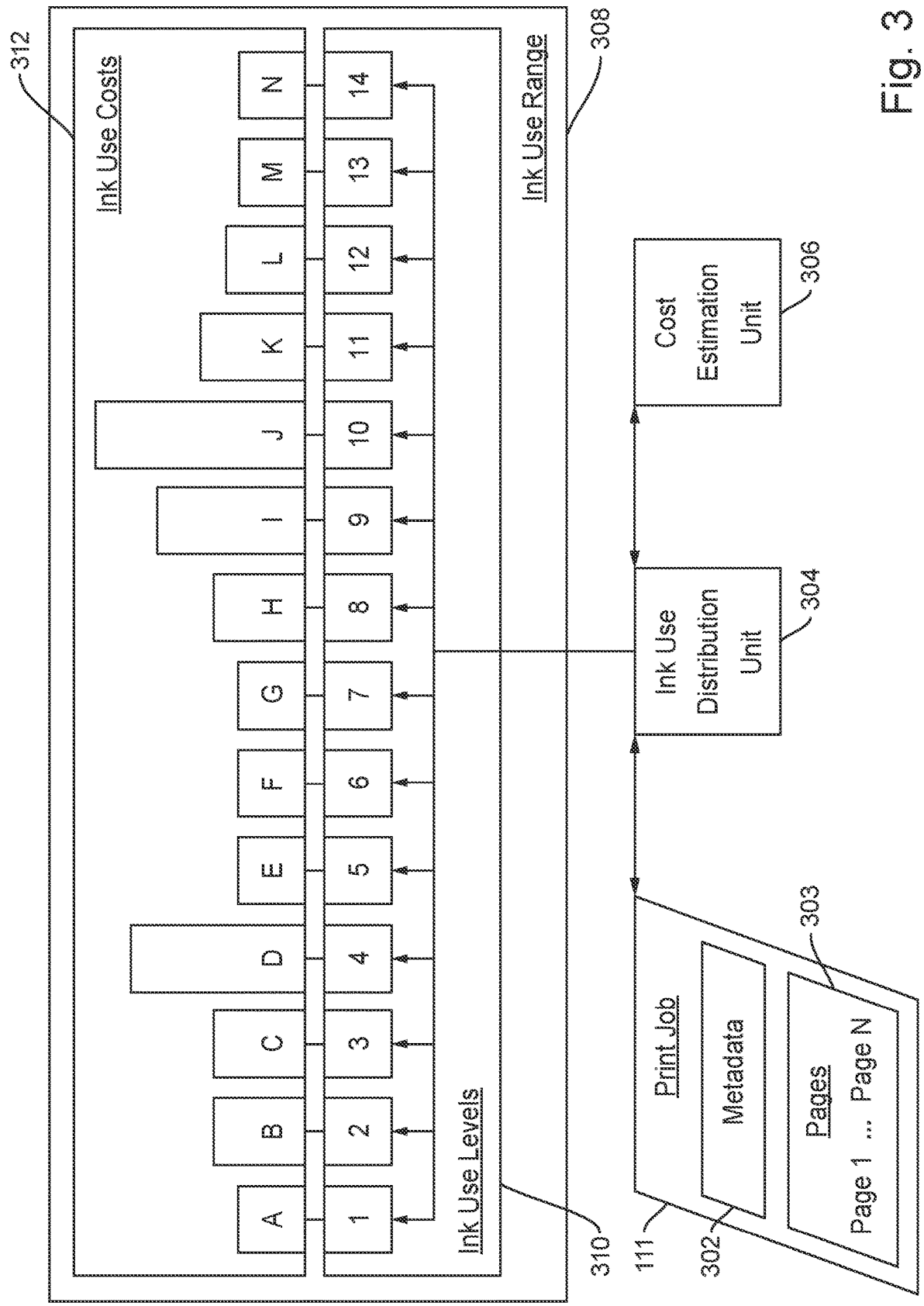
FIG. 3 illustrates an example ink use distribution of a print job for an ink use range according to the disclosed embodiments.

FIG. 3 depicts an example ink use distribution of print job 111 for an ink use range 308 according to the disclosed embodiments. Ink use distribution unit 304 distributes the pages within print job 111 between ink levels 310 of ink use costs 312. Each ink use level may represent an amount of ink use to print the respective page. Ink use distribution unit 304 may determine this amount and assign each page to an ink use level. Cost estimation unit 306 may be used to determine the estimated cost per page as well as the total cost for each level, shown as ink use costs 312. Ink use distribution unit 304 and cost estimation unit 306 may be implemented in application 128 at client device 110 or application 114 at display device 112. Further, either or both units may be implemented at printing device 104 or print management server 108.

Print job 111 may include pages 1 through N for a document. For example, the document to be printed by print job 111 may include 100 pages. Each page takes a certain amount of ink to print. Ink use estimation unit 304 determines this amount and assigns the page to an ink use level within ink use range 308. Print job 111 also includes metadata 302 which includes data not necessarily printed with the document. Metadata 302 also may include ink use information for pages 303, also shown as pages 1 to N.

Ink use range 308 is a range having the minimum and maximum ink use for print job 111. Ink use range 308 may be based on the needs to print the print job or constraints of printing device 104. For example, ink use range 308 be between 20 picoLitres (pL) and 160 pL. Ink use range 308 also may include a cost per page to print the page instead of ink use level.

If ink use range 308 is between 20 and 160 pL, then it may be divided into ink use levels, or buckets, 310 to designate the amount of ink used to print the pages in that level. For example, each ink use level 310 may include 10 pL segments. Thus, ink use level 1 may include between 20-29 pL, ink use level 2 may include between 30-39 pL, ink use level 3 may include between 40-49 pL, ink use level 4 may include between 50-59 pL, ink use level 5 may include between 60-69 pL, ink use level 6 may include between 70-79 pL, ink use level 7 may include between 80-89 pL, ink use level 8 may include between 90-99 pL, ink use level 9 may include between 100-109 pL, ink use level 10 may include between 110-119 pL, ink use level 11 may include between 120-129 pL, ink use level 12 may include between 130-139 pL, ink use level 13 may include between 140-149 pL, and ink use level 14 may include 150-160 pL.

Preferably, each ink use level 310 includes a different number of pages. For example, ink use level 1 may include 4 pages while ink use level 2 includes 6 pages of print job 111. The number of pages for each ink use level plus the amount of ink used to print each page at the level can be used to determine the cost of ink use for each level. The cost may be shown by ink use costs 312. As can be seen, ink use costs vary between ink use levels.

Thus, ink use level 1 may have an ink cost A. Ink use level 2 may have an ink cost B. Ink use level 3 may have an ink cost C. Ink use level 4 may have an ink cost D. Ink use level 5 may have an ink cost E. Ink use level 6 may have an ink cost F. Ink use level 7 may have an ink cost G. Ink use level 8 may have an ink cost H. Ink use level 9 may have an ink cost I. Ink use level 10 may have an ink cost J. Ink use level 11 may have an ink cost K. Ink use level 12 may have an ink cost L. Ink use level 13 may have an ink cost M. Ink use level 14 may have an ink cost N. Ink costs 312 may be generated by cost estimation unit 306.

Information may be derived from ink use range 308, ink use levels 310, and ink costs 312, especially when displayed on display device 112, client device 110, or printing device 104. This feature allows the customer or user to see details for each ink use level. The customer or user may click in a bar for the ink cost for an ink use level and then go to a page that shows not only the ink use and cost information but also the document pages which are part of the ink use level. The disclosed embodiments also may allow the user to browse these pages in, for example, display 116 or 132. These features all allow one to identify pages that may be modified to lower ink use and reduce cost for print job 111.

For example, FIG. 3 shows high ink costs D and J for ink use levels 4 and 10, respectively. Ink use level 4 may have 10 pages of the 100 page total for print job 111 so perhaps nothing should be done to reduce ink use for these pages to lower costs. Ink use level 10, however, may only include 2 pages. Ink use for these pages may be modified to reduce costs. The print shop may suggest changes to these pages to lower ink use. In contrast, ink use levels 1, 5, 6, 7, 13, and 14 probably should not be adjusted. The ink use for the pages associated with these ink levels should remain the same to preserve the desired print quality.

Thus, the disclosed embodiments allow one to determine, on a granular level, the ink use and associated costs for pages within print job 111. If costs are to be reduced, then perhaps pages associated with ink use levels 4, 9, 10, and 11 are reviewed to see if they may be modified to reduce their ink use and get the ink costs lower.

The disclosed embodiments also may allow one to define alternate color reproductions for pages in specific ink use levels. The color reproduction may lower the overall ink limit for those pages. These features are disclosed in greater detail below.

Figure 4:
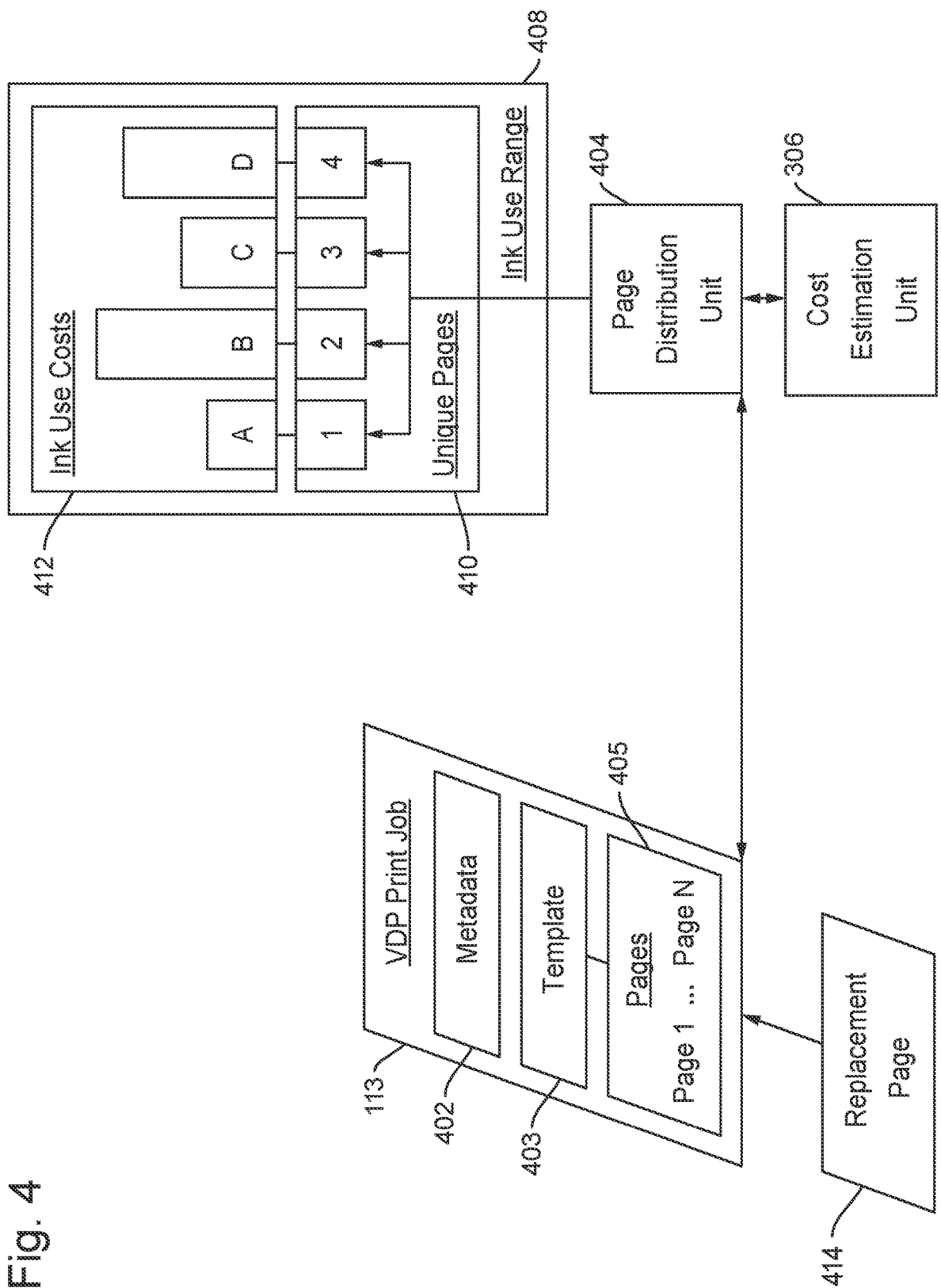
FIG. 4 illustrates an example ink use distribution of a VDP print job for an ink use range according to the disclosed embodiments.

FIG. 4 depicts an example ink use distribution of a VDP print job 113 for an ink use range 408 according to the disclosed embodiments. FIG. 4 includes VDP print job 113, which includes a VDP document that uses a common underlying template. VDP print job 113 may include pages or documents within the print job formed by using the template. For example, the template may include an image object that places a specified image from a plurality of images for unique pages using that image. For VDP print job 113, four (4) unique pages may be found using template 403. Depending on criteria used to generate VDP print job 113 with template 403, pages 1 to N may be unique page 1, unique page 2, unique page 3, and unique page 4. In some embodiments, there may be more than 4 unique pages.

For ink use and cost estimation, VDP print job 113 may be broken into one of the four unique pages. The VDP print job may include 1000s of "pages" that are generated using template 403. The pages may actually be documents, such as flyers, brochures, postcards, and the like that use document template 403. Using variable data printing operations, the documents differ in some aspect from each other. For example, each unique page may have a unique image that is placed on the page according to document template 403. If there are four unique pages, then preferably four unique images are used by document template 403 to create VDP print job 113. VDP print job 113 also includes metadata 402, which may be similar to metadata 302 disclosed above.

The processes for determining ink use for each unique page may be similar to the embodiments disclosed in FIG. 3, except that a page distribution unit 404 may be used in conjunction with cost estimation unit 306 to assign each page 1 to N of pages 405 to one of unique pages 410 for ink use range 408. Instead of ink use levels, pages are assigned to one of the unique pages found in VDP print job 113, usually made unique based on an object that varies from page to page. If VDP print job 113 includes 1000 pages, or documents, then each one of the 1000 pages is assigned to unique page 1, unique page 2, unique page 3, or unique page 4. As one can appreciate, the distribution should not be uniform in that each unique page of ink use range 408 has the same amount of pages assigned to it.

For example, unique page 1 may include an image of a rabbit, unique page 2 may include an image of a horse, unique page 3 may include an image of a cat, and unique page 4 may include an image of a dog. Template 403 is used to place the appropriate image in each page of VDP print job 113. Which image may depend on the interest of the document, page, with the print job to a recipient. Page distribution unit 404 may look to the image used in each page to assign it to the correct unique page.

Ink use costs 412 may be determined depending on the ink use for a unique page and the total number of pages assigned from the print job to the unique page. In a sense, unique page 1 has an ink use level common to pages having rabbits, unique page 2 has an ink use level common to pages having horses, unique page 3 has an ink use level common to pages having cats, and unique page 4 has an ink level common to pages having dogs. The amount of ink needed to print unique page 1 will differ from the amount of ink needed to print unique page 2. Ink use costs 412 may take into account these ink use levels for each unique page.

As shown in FIG. 4, unique page 1 includes ink use cost A, unique page 2 includes ink use cost B, unique page 3 includes ink use cost C, and unique page 4 includes ink use cost D. Ink use cost A and ink use cost C appear lower than ink use cost B and ink use cost D. Thus, one may determine that any actions to lower ink use may begin with unique pages 2 and 4. The disclosed embodiments may allow the print shop and their customers to ascertain which pages may be replaced to lower ink use and costs.

For example, the image used for the horse for unique page 2 may require a lot of color ink to print. A replacement image may be used for the horse. Replacement page 414 may be provided for use in VDP print job 113 by document template 403. After rerunning the disclosed process, the ink use for unique page 2 may be lowered such that ink use B is below or at the same levels as ink use costs A and C. The same action may be taken for unique page 4 to lower ink use cost D.

Thus, the disclosed embodiments may allow the customer to upload replacement content for any of the unique pages in VDP print job 113. The disclosed system would then estimate ink use for the replacement pages 414. The updated overall ink use and cost estimation for the replacement pages may be shown along with the difference in ink use and the cost between the replacement and original unique pages. Thus, the print shop or customer may make adjustments to lower costs and ink use in a dynamic manner.

Figure 5:
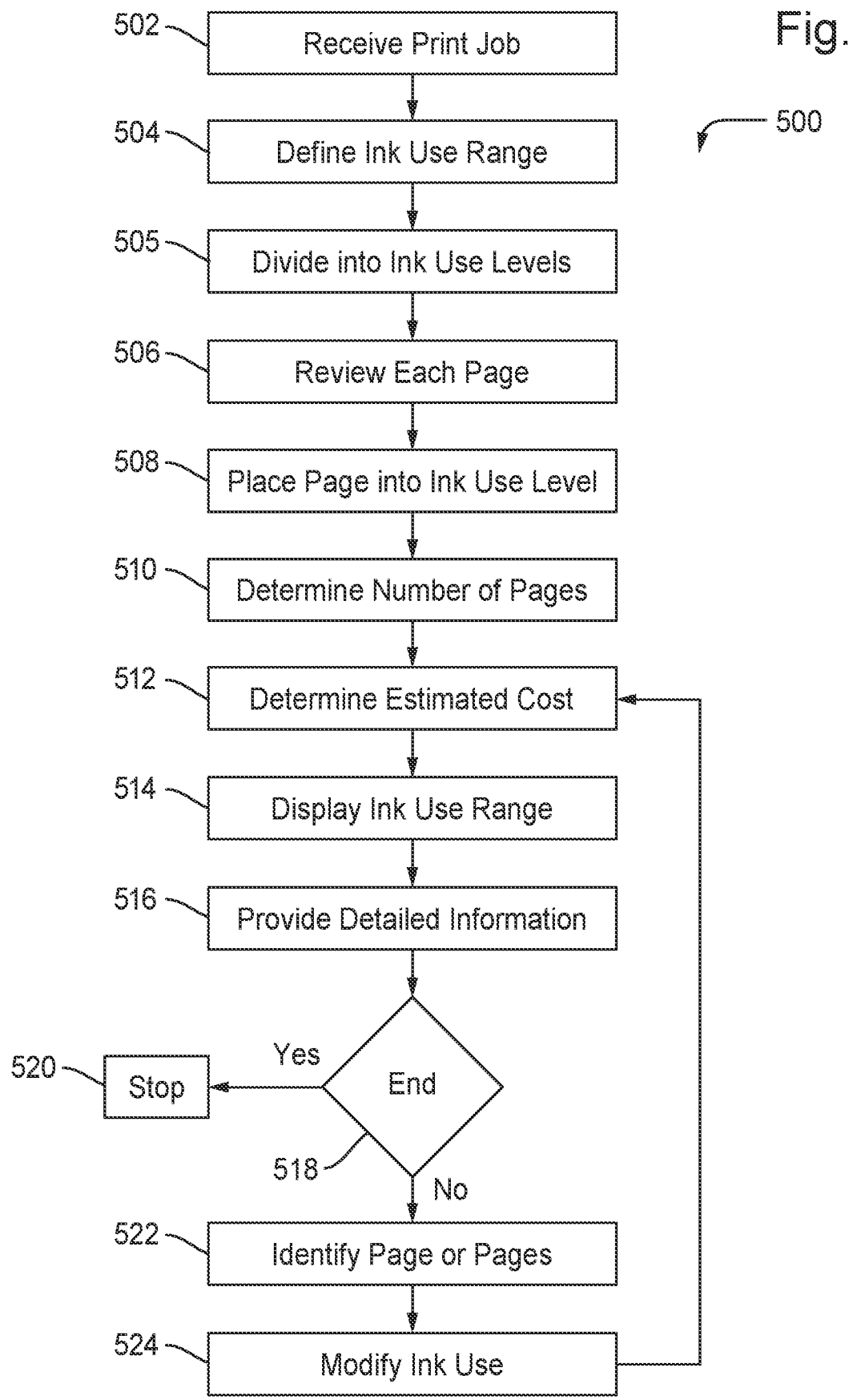
FIG. 5 illustrates a flowchart for determining ink use for a print job at a printing device according to the disclosed embodiments.

FIG. 5 depicts a flowchart 500 for determining ink use for print job 111 at printing device 104 according to the disclosed embodiments. Flowchart 500 may refer to FIGS. 1-4 for illustrative purposes. Flowchart 500, however, is not limited to the embodiments disclosed by FIGS. 1-4.

Step 502 executes by receiving print job 111 within printing system 100. Print job 111 may be generated at client device 110 by application 128. Application 128 also may perform the processes disclosed below using ink use distribution unit 304 and cost estimation unit 306. Print job 111 includes a plurality of pages 303, or pages 1 to N. Step 504 executes by defining ink use range 308 using the minimum and maximum ink use for print job 111. Referring back to FIG. 3, ink use range 308 may be from 20 pL to 160 pL. In other embodiments, ink use range 308 may be smaller or larger than these values.

Step 505 executes by dividing ink use range 308 into a plurality of ink use levels 310. Each ink use level is defined by an amount of ink used to print one page for the level. As shown in FIG. 3, ink use range 308 may be divided into 14 ink use levels, each one representing a range of 10 pL of ink used to print a page assigned to that level. Step 506 executes by reviewing each page 1 to N of print job 111. Part of the review is to determine how much ink will be needed to print the respective page. Step 508 executes by placing the reviewed page into an ink use level based on the ink used to print the page. The ink use may be an estimated ink use as print job 111 has not be printed yet. For example, page 32 may use 43 pL of ink to print. Thus, it is placed in ink use level 3 for 40-49 pL of ink used to print a page. Page 33 may use 102 pL of ink to print and is placed in ink use level 9 of ink use range 308.

Step 510 executes by determining a number of pages for each ink use level 310. As disclosed above, different ink use levels have a variety of pages placed therewithin. Print job 111 most likely will not be distributed evenly across ink use range 308. For example, referring to FIG. 3, ink use levels 4, 9, and 10 may have the most pages assigned by ink use distribution unit 304. Step 512 executes by determining the estimated cost for each ink use level. The disclosed embodiments may determine the total amount of ink used to print the pages to the ink use level. Cost estimation unit 306 may determine this amount for each ink use level using the total number of pages determined above.

Step 514 executes by displaying ink use range 308 along with ink use levels 310 and ink use costs 312. This information may be displayed using a graphical user interface at display device 112. Step 516 executes by displaying detailed, or granular, information for ink use by print job 111. Display 116 may show a count for the number of pages in each ink use level 310 of ink use range 308. Display 116 also may show the cost of ink use for each ink use level, shown as ink use costs 312. The user may click on an ink use level or ink use cost to view this data. Display 116 may go to a page that shows not only the ink use and cost information but also the document pages that are assigned to the specific ink use level. The user can browse these pages to determine whether changes may be made to lower ink use without sacrificing print quality.

Step 518 executes by determining whether to end the ink use determination and estimation session being displayed. If yes, then step 520 executes by stopping the disclosed process. If step 518 is no, then step 522 executes by identifying a page or group of pages to move from one ink use level to another. The pages may be assigned to the new ink use level in an effort to lower overall costs. For example, it may be shown that 5% of the pages represent 20% of the ink use and cost. These pages may be moved to a lower ink use level in an effort to lower costs. Thus, step 524 executes by modifying the ink use for the identified page or pages. Flowchart 500 proceeds back to step 512 to provide updated estimated costs for print job 111 and updates to ink use range 308. For example, some pages assigned to ink use level 10 may be moved to ink use level 7. Ink use cost G is adjusted accordingly to reflect the increase in pages assigned to this ink use level. Preferably, ink use cost J is lowered as the number of pages assigned to ink use level 10 is reduced.

Figure 6:
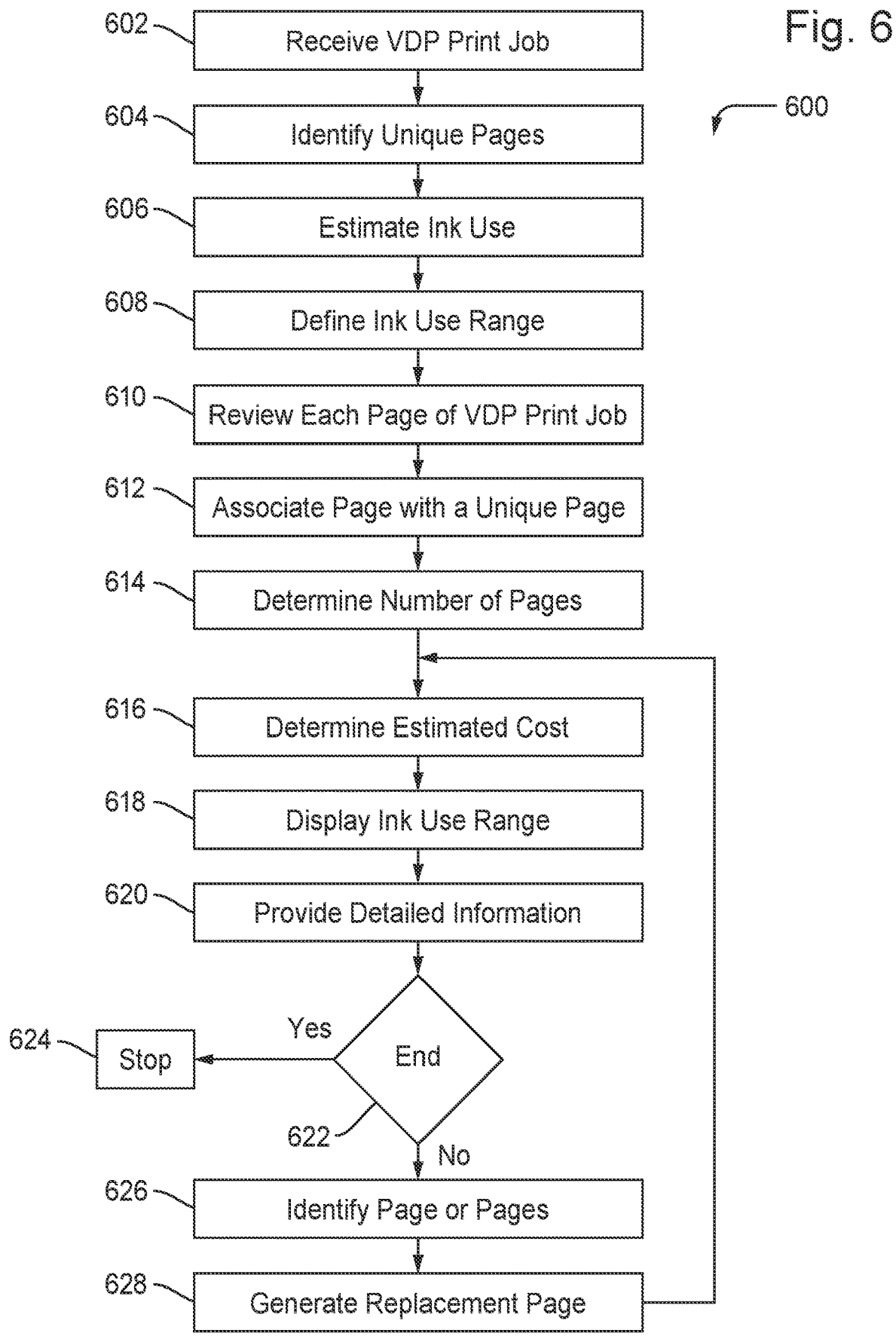
FIG. 6 illustrates a flowchart for determining ink use for a VDP print job at a printing device according to the disclosed embodiments.

FIG. 6 depicts a flowchart 600 for determining ink use for VDP print job 113 at printing device 104 according to the disclosed embodiments. Flowchart 600 may refer to FIGS. 1-5 for illustrative purposes. Flowchart 600, however, is not limited to the embodiments disclosed by FIGS. 1-5.

Step 602 executes by receiving VDP print job 113 within printing system 100. VDP print job 113 should have at least two pages or documents as it is generated using variable data printing operations. Variable data printing may use document template 403 to generated different pages having some similar features and some varying features. VDP print job 113 may be generated at client device 110 by application 128. Application 128 also may perform the processes disclosed below using page distribution unit 404 and cost estimation unit 306. VDP print job 111 includes a plurality of pages 404, or pages 1 to N. Step 604 executes by identifying the unique "pages" or documents within VDP print job 113. As disclosed above, unique pages may be the different pages generated using the document template in VDP operations. For example, document template 403 may use four different images for an image object in the template. Thus, there may be four unique pages. In other embodiments, there may be multiple objects within template 403 that result in a larger number of unique pages.

Step 606 executes by estimating the ink use for each unique page identified above. Referring to FIG. 4, unique page 1 may use 35 pL to print a page in VDP print job 113 having its features. Unique page 2 may use 43 pL, unique page 3 may use 77 pL, and unique page 4 may use 28 pL. Thus, unique page 3 appears to use the most ink for each page printed using its objects. Step 608 executes by defining ink use range 408 for unique pages 410 of VDP print job 113. Ink use range 408 may include an entry for each unique page.

Step 610 executes by reviewing each page of VDP print job 113 to determine which unique object is used to generate the page. Using the above example, if unique pages 410 use a unique image for each different type, then page distribution unit 404 may look to the image used to print the respective page. Step 612 executes by associating the page with a unique page. In short, each page or document in VDP print job 113 is assigned to a unique page "bucket" within ink use range 408.

Step 614 executes by determining a number of pages associated with each unique document page 410. As disclosed above, different unique pages have a variety of pages associated thereto. VDP print job 113 most likely will not be distributed evenly across ink use range 408. For example, referring to FIG. 4, unique pages 2 and 4 may have the most pages assigned by page distribution unit 404. Step 616 executes by determining the estimated cost for each unique page of ink use range 408. The disclosed embodiments may determine the total amount of ink used to print the pages assigned to the unique page. Cost estimation unit 306 may determine this amount for each unique page using the total number of pages determined above.

Step 618 executes by displaying ink use range 408 along with unique pages 410 and ink use costs 412. Step 618 is similar to step 514 disclosed above. Step 620 executes by providing detailed, or granular, information for ink use by VDP print job 113. Display 116 may show a count for the number of pages in each unique page 410 of ink use range 408. Display 116 also may show the cost of ink use for each unique page, shown as ink use costs 412. The user may click on an ink use level or ink use cost to view this data. Display 116 may go to a page that shows not only the ink use and cost information but also the document pages that are assigned to the specific unique page. The user can browse these pages to determine whether changes may be made to lower ink use without sacrificing print quality.

Step 622 executes by determining whether to end the ink use determination and estimation session being displayed. If yes, then step 624 executes by stopping the disclosed process. If step 622 is no, then step 626 executes by identifying one or more unique pages to replace within VDP print job 113 to lower costs or modify ink use for the print job. Step 628 executes by generating a replacement page 414 for each of the identified unique pages. The customer may upload replacement content for each of the identified unique pages. This replacement content may generate replacement page 414. Flowchart 600 then proceeds back to step 616 to provide updated ink use and cost estimation information for ink use range 408.

Figure 7:
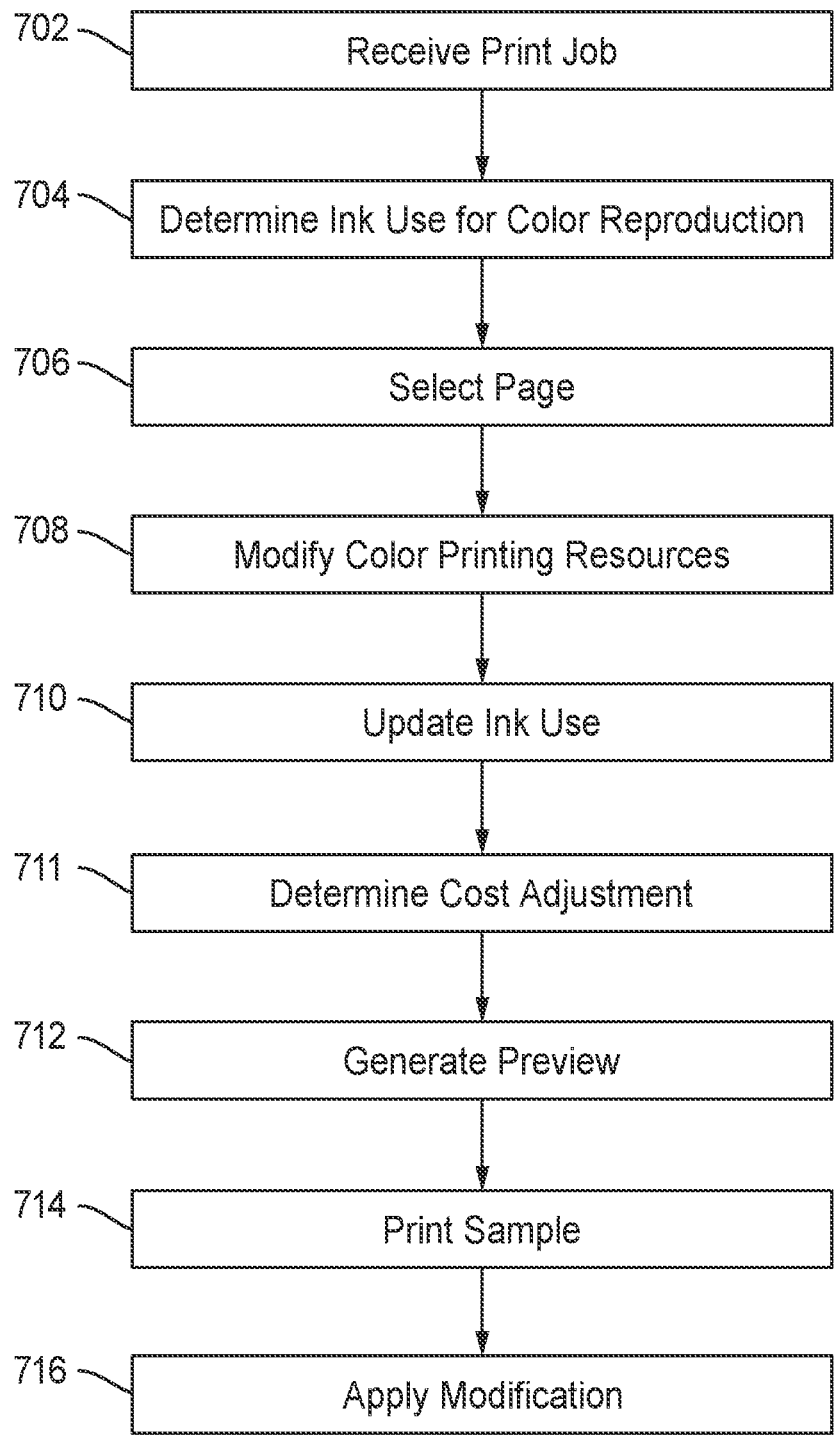
FIG. 7 illustrates a flowchart for implementing alternate ink use operations according to the disclosed embodiments.
Figure 8:
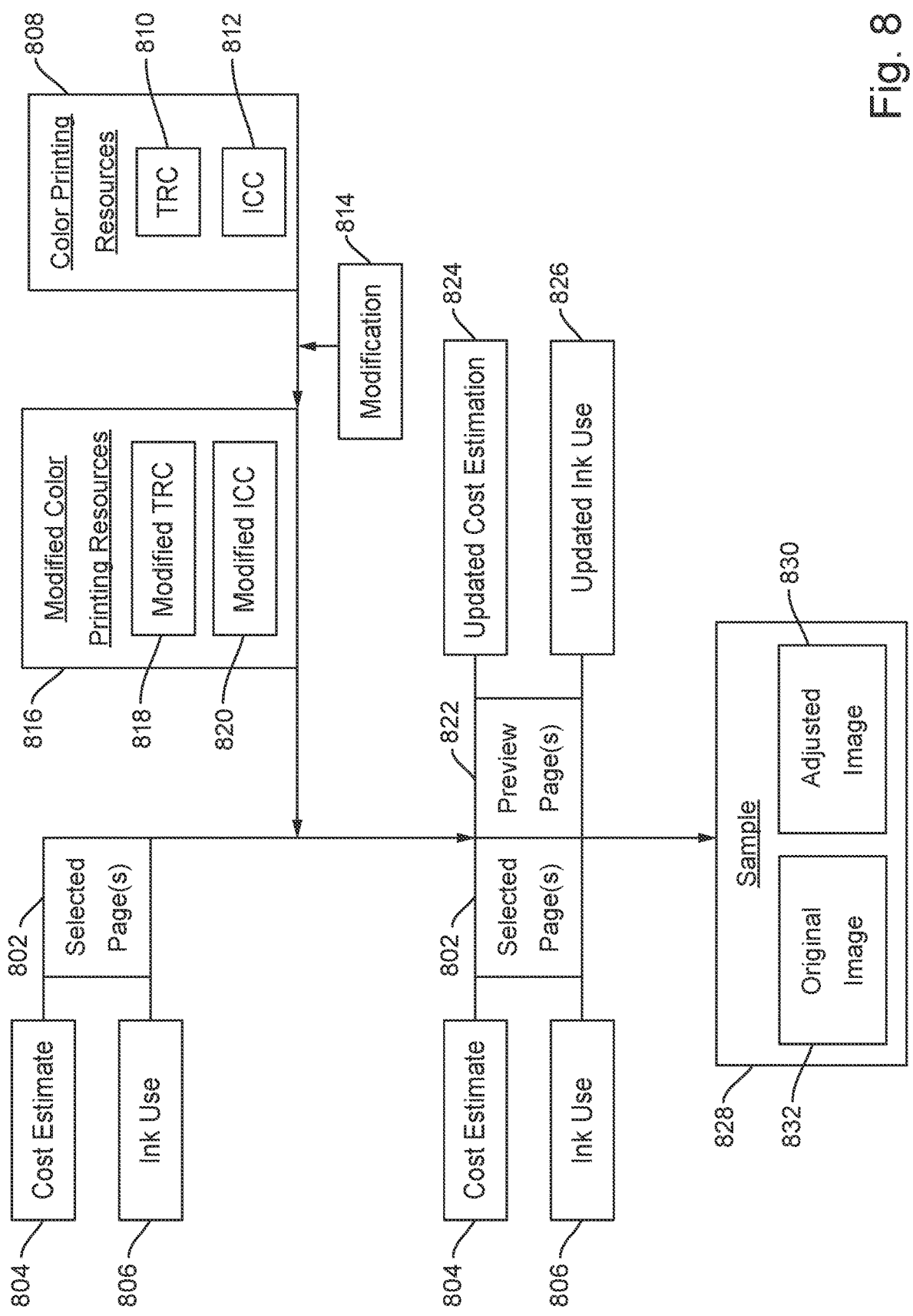
FIG. 8 depicts a block diagram of selected page or pages applying modified color printing resources according to the disclosed embodiments.

FIG. 7 depicts a flowchart 700 for implementing alternate ink use operations according to the disclosed embodiments. FIG. 8 depicts a block diagram of selected page or pages 802 (hereinafter "selected pages") applying modified color printing resources 816 according to the disclosed embodiments. Flowchart 700 may refer to FIGS. 1-6 and 8 for illustrative purposes. Flowchart 700, however, is not limited to the embodiments disclosed by FIGS. 1-6 and 8. The disclosed embodiments allow the customer to define alternate color reproduction for the pages in ink use levels 310 for print job 111 or unique pages 410 for VDP print job 113.

Step 702 executes by receiving a print job, such as print job 111 or VDP print job 113, having a plurality of pages. Each page includes an ink use amount to print that page. Step 704 executes by determining ink use for printing the print job using color printing resources 808. Color printing resources 808 may be the data and components used to color print the received print job at printing device 104. Color printing resources may include TRC 810 and ICC profile 812. These features help print the color items in the print job accurately and with a desired quality.

Step 706 executes by selecting one or more pages 802 from the print job. As disclosed above, the selected pages may be associated with an ink use level or a unique page, depending on the type of print job. For selected pages 802, cost estimate 804 and ink use 806 is provided for printing the selected pages using color printing resources 808. Step 708 executes by modifying color printing resources 808 to generate modified color printing resources 816. Modification 814 may be made to one or more of color printing resources 808. For example, TRC 810 or ICC profile 812 may have settings that are changed to modify the color printing resources. The overall ink limit for selected pages 802 may be lowered. The change results in modified color printing resources 816 having modified TRC 818 and modified ICC profile 820. These modified color printing resources may only apply to selected pages 802 and not to the entire print job. The color reproduction adjustments are made to a subset of pages of a print job.

Step 710 executes by updating the ink use for selected pages 802 based on modified color printing resources 816. Step 711 executes by determining the cost adjustment being made to the print job or to selected pages 802 due to the modified color printing resources. The disclosed embodiments may update the overall ink use and cost estimation for the print job as well as the difference in ink use and cost between the original selected pages 802 and the new pages to be printed using the modified color printing resources.

Step 714 executes by generating preview page or pages 822 (hereinafter "preview pages") based on modified color printing resources 816. Preview pages 822 also include updated cost estimation 824 and updated ink use 826 determined as a result of the modified color printing resources. Preferably, modification 814 lowers ink use for printing selected pages 802. Preview pages 822 and selected pages 802 may be displayed together along with their cost estimation and ink use information to the user or customer, such as on display device 112. The side by side display would allow one to understand the difference in appearance as well as the savings and lower ink use provided by modification 814.

Step 714 executes by printing a sample 828 of the adjusted pages so that the user can ascertain the difference in appearance. Sample 828 may show the image or page twice in the page: an image 832 with the original color settings and an image 830 with the new color settings. Thus, sample 828 may include the original page to be printed using color printing resources 808 along with the adjusted page to be printed using modified color printing resources 816. This feature allows the user to review the estimated cost savings versus any reduction in print quality or color accuracy. Step 716 executes by applying modification 814 to selected pages 802 in processing the print job, if approved by the user or customer.

The disclosed process for flowchart 700 also may be implemented for selected pages in a print job that have nothing to do with ink use levels or unique pages. For example, a user may desire to modify color printing resources for the front and back cover of a document or pages only using text. Application 128, for example, may allow the user to view and select pages from the print job that are then subject to modified color printing resources 816. Alternatively, the user may wish to improve color printing quality for selected pages 802 so that modification 814 does not necessarily lower printing costs and ink use.

The print shop may configure the ink estimation to not only provide costs but to provide the customer a quote for the printing portion of the print job. The ink estimation would be offered to the customer so that he/she can make the same determination as the print shop. This feature may allow the customer to determine what, if any, adjustments to be made to the print job in order to lower costs, thereby enabling ink use estimation for print shop customers. Further, several different modifications 814 may be made to color printing resources for different groups of selected pages 802 such that the customer can pick and choose which modifications to apply to the print job. The disclosed embodiments provide flexibility to the print shop and customer for color printing.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for determining ink use at a printing device, the method comprising:
    receiving a print job having a plurality of pages;
    defining an ink use range using a minimum ink use value and a maximum ink use value for the print job;
    dividing the ink use range into a plurality of ink use levels, wherein each ink use level is defined by an amount of ink used to print one page of the print job;
    for each page, placing the page into an ink use level based on an estimated ink use to print the page;
    determining a number of pages for each ink use level;
    determining an estimated cost for each ink use level; and
    displaying the ink use range with the plurality of ink use levels, wherein each ink use level is associated with its respective number of pages and its respective estimated cost.

2. The method of claim 1, further comprising displaying the respective number of pages and the respective estimated cost when indicated.

3. The method of claim 1, further comprising displaying the plurality of pages of the print job, wherein each page includes information regarding the estimated ink use and an estimated cost to print the page.

4. The method of claim 1, further comprising identifying a page of the plurality of pages.

5. The method of claim 4, further comprising modifying the estimated ink use for the page.

6. The method of claim 1, further comprising moving a page of the plurality of pages from a first ink use level to a second ink use level such that the estimated ink use for the page is modified.

7. The method of claim 6, wherein the moving the page lowers an overall estimated ink use for the print job.

8. A method for determining ink use at a printing device, the method comprising:
    receiving a (VDP) print job having at least two pages;
    identifying a plurality of unique document pages used to generate the VDP print job, wherein each of the plurality of unique document pages includes an object;
    estimating ink use for each of the plurality of unique document pages;
    for each page in the VDP print job, associating the page with one of the plurality of unique document pages;
    determining a number of pages associated with each unique document page;
    determining an estimated cost for each unique document page based on the number of pages; and
    displaying the plurality of unique document pages, wherein each unique document page is associated with its respective number of pages and its respective estimated cost.

9. The method of claim 8, further comprising replacing one of the plurality of unique document pages with a replacement unique document page.

10. The method of claim 9, further comprising updating the determination of the estimated cost for each unique document page.

11. The method of claim 10, further comprising determining an overall estimated cost for printing the VDP print job.

12. The method of claim 8, wherein the object is an image object that is used to place an image in the unique document page.

13. The method of claim 12, further comprising replacing the image for the image object with a replacement image.

14. The method of claim 13, further comprising updating the determination of the estimated costs for the unique document page having the replacement image.

* * * * *